Nov. 11, 1941.    G. A. DE VLIEG    2,262,099

MACHINE FOR SHARPENING ROTARY CUTTERS

Filed March 3, 1939    6 Sheets-Sheet 1

INVENTOR
Gerard A. DeVlieg
BY
Parker, Carlson, Pitzner & Hubbard
ATTORNEYS

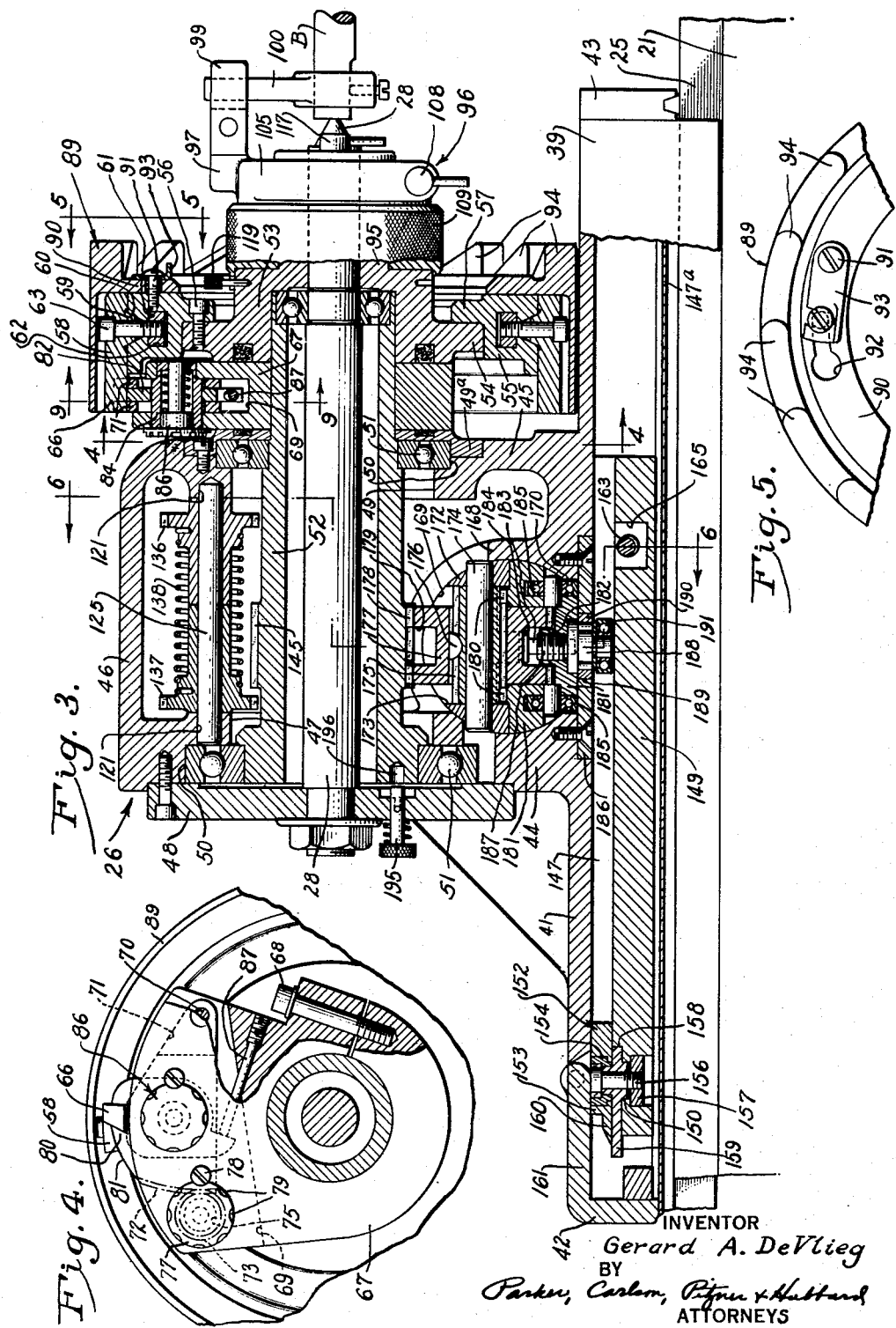

Nov. 11, 1941.   G. A. DE VLIEG   2,262,099
MACHINE FOR SHARPENING ROTARY CUTTERS
Filed March 3, 1939   6 Sheets-Sheet 3

INVENTOR
Gerard A. DeVlieg
BY
Parker, Carlson, Pitner & Hibbard
ATTORNEYS

Nov. 11, 1941.   G. A. DE VLIEG   2,262,099
MACHINE FOR SHARPENING ROTARY CUTTERS
Filed March 3, 1939   6 Sheets-Sheet 4

INVENTOR
Gerard A. DeVlieg
BY
Parker, Carlson, Pitzner & Hubbard
ATTORNEYS

Nov. 11, 1941.   G. A. DE VLIEG   2,262,099
MACHINE FOR SHARPENING ROTARY CUTTERS
Filed March 3, 1939   6 Sheets-Sheet 5
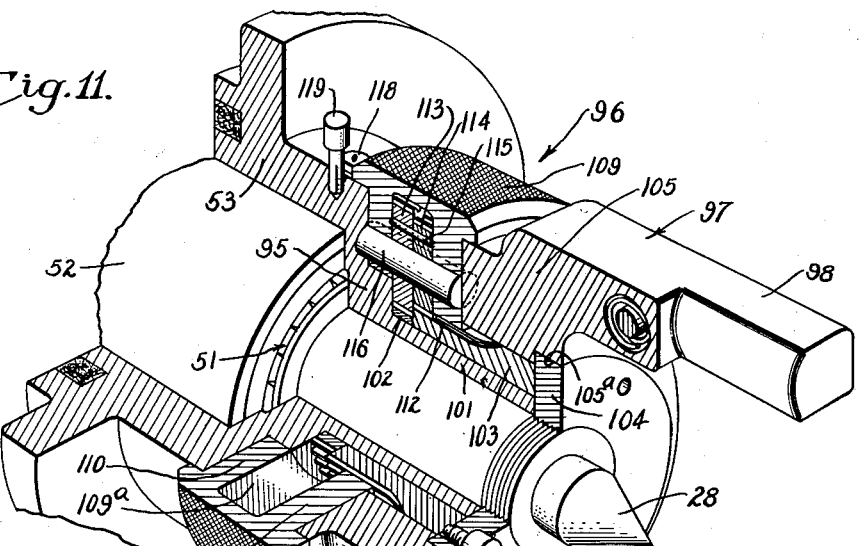
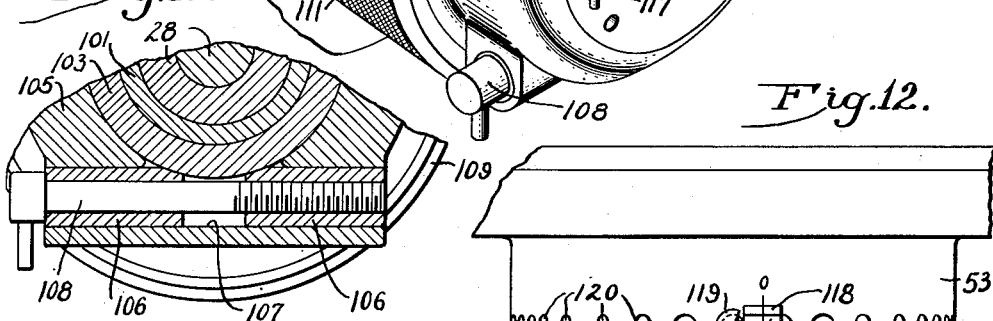
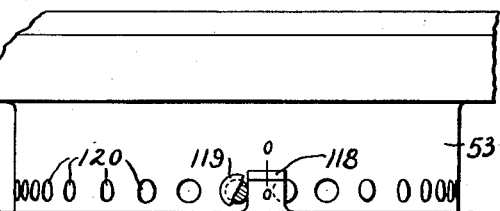
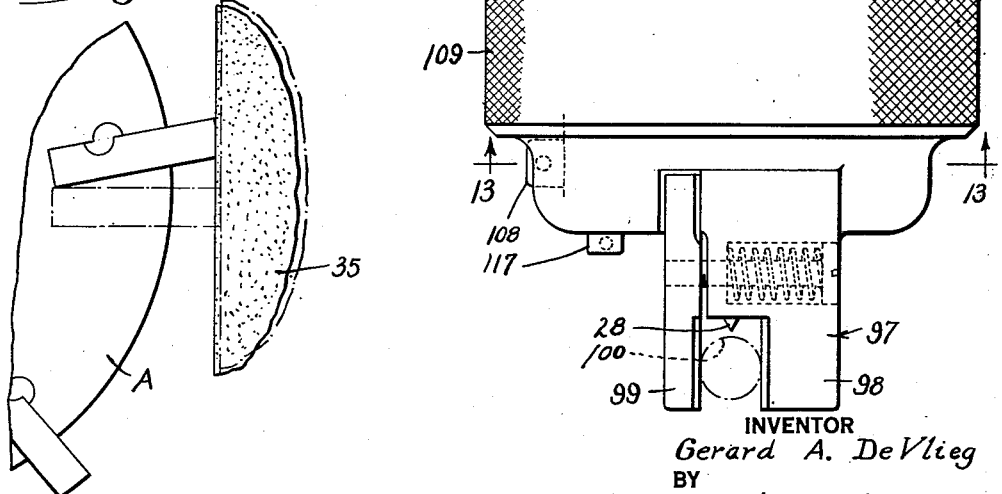
INVENTOR
Gerard A. DeVlieg
BY
Parker, Carlson, Pitner & Hubbard
ATTORNEYS Nov. 11, 1941.  G. A. DE VLIEG  2,262,099
MACHINE FOR SHARPENING ROTARY CUTTERS
Filed March 3, 1939  6 Sheets-Sheet 6

INVENTOR
Gerard A. DeVlieg
BY
Parker, Carlson, Pitzner & Hubbard
ATTORNEYS

Patented Nov. 11, 1941

2,262,099

UNITED STATES PATENT OFFICE 2,262,099

MACHINE FOR SHARPENING ROTARY CUTTERS

Gerard A. De Vlieg, Rockford, Ill.

Application March 3, 1939, Serial No. 259,521

17 Claims. (Cl. 51—123)

The invention relates to machines for sharpening rotary cutters, such as reamers, hobs, milling cutters and the like, and the general aim is to provide a new and improved machine of this nature which will sharpen a wide variety of such tools efficiently and with a high degree of accuracy.

An object of the invention is to provide an improved machine which embodies novel means providing positive mechanical control of accuracy.

Another object is to provide new and improved means which is positive and accurate for manually indexing the cutter.

A further object is to provide a novel lead control mechanism which is adjustable through a relatively wide range, and which can be readily maintained and duplicated. In this connection, improved means is provided for imposing a working spring tension on the rotatable parts of the lead control mechanism that is exceedingly compact and accurately adjustable.

Another object is to provide new and improved means for accurately measuring and controlling the amount of rotative feed of the work. Such means includes a novel mechanism which permits manual operation of the control means to determine with high accuracy the amount of material removed in sharpening hobs, or to set and duplicate the cutting of diameter and relief clearances on cutters and reamers.

Another object is to provide a machine embodying the features above set forth in which the various controls of machine operation are well adapted for manual actuation, and the simplified construction provides a machine which is comparatively inexpensive.

Other objects and advantages will become apparent in the following and from the accompanying drawings, in which:

Fig. 3 is an axial section through the headstock on a vertical plane taken as indicated by the line 3—3 in Fig. 6.

Fig. 4 is a fragmentary sectional view taken substantially along the line 4—4 of Fig. 3.

Fig. 5 is an end face view of the indexing means on the headstock looking in the direction of the arrows 5—5 of Fig. 3.

Fig. 11 is a perspective view partially in section illustrating the construction of the manually adjustable chuck on the headstock.

Fig. 12 is a plan view of the chuck.

Fig. 13 is a fragmentary view illustrating a detail of the chuck construction and is taken substantially along the line 13—13 of Fig. 12.

Fig. 14 is a fragmentary, somewhat diagrammatic view showing the angular setting between the cutting element and a blade to be ground.

Figure 1:
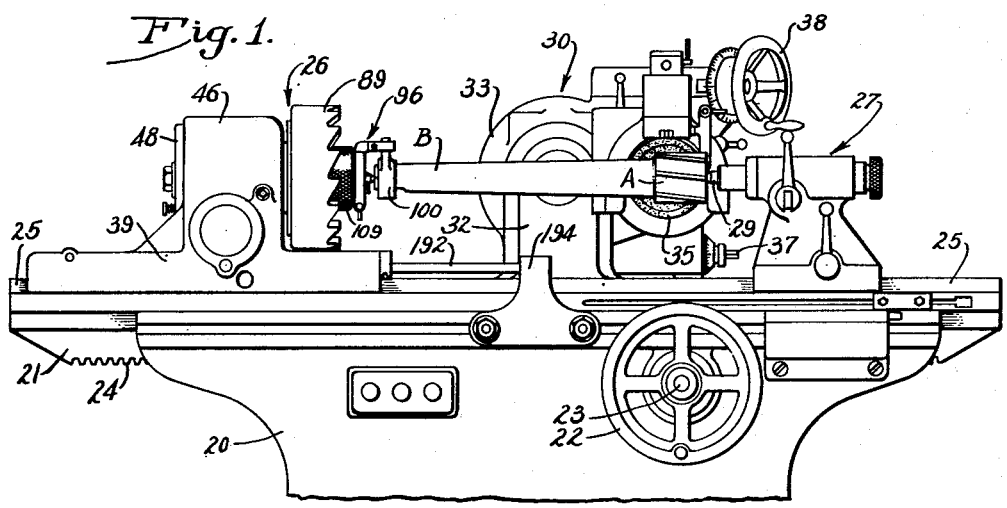
Figure 1 is a front view in elevation on a reduced scale of the upper portion of a machine embodying the features of the invention.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The exemplary embodiment of the machine, which has been selected for illustrative purposes, comprises generally the following construction. A base 20 has an elongated upper surface finished in the conventional manner to support a carriage 21 for longitudinal reciprocation. In this instance, reciprocatory movement is manually effected by the operator through such means as a hand wheel 22 (Fig. 1) on a shaft 23 which is drivingly connected by suitable gearing (not shown) with a rack 24 on the carriage. The upper surface of the carriage has longitudinally extending dovetail ways 25 on which a headstock and a tailstock, generally designated 26 and 27 respectively, are mounted. The headstock and the tailstock are independently adjustable along the ways and carry centers 28 and 29, respectively, for engagement with a work arbor or shank B supporting the work piece A.

Figure 15:
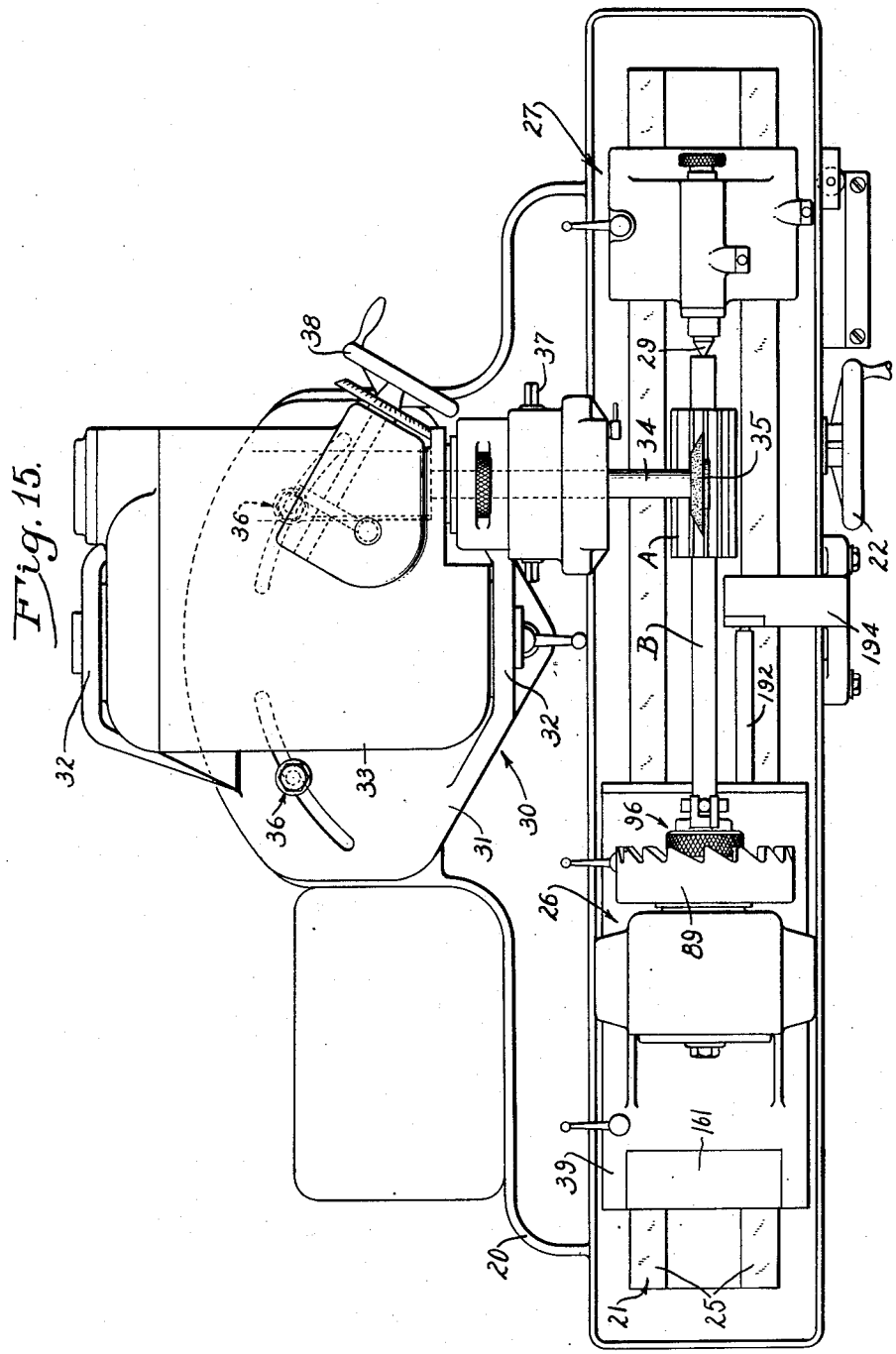
Fig. 15 is a plan view of the machine illustrated in Fig. 1.

A grinding head assembly 30 (Figs. 1 and 15) is mounted on the base at the rear side of the carriage and intermediate the limits of its travel. Briefly, the grinding head assembly comprises a U-shaped supporting frame 31 (Fig. 15) which includes upstanding arms 32 arranged pivotally to support therebetween a motor enclosing housing 33. A spindle 34 for a grinding element 35 is journaled in the housing at one side of the motor.

The grinding wheel assembly includes a number of means for variously adjusting the position of the grinding element 35 with respect to the work piece. Thus, the frame 31 is supported on the base 20 for pivotal movement about a vertical axis, its positions of adjustment being maintained by the bolt and slot connections 36. The location of the spindle 34 at either side of the pivotal axis of the housing 33 permits vertical adjustment of the grinding element by swinging the housing about its pivotal axis. This adjustment is obtained through mechanism actuated by the crank shaft 37. A hand wheel 38 controls means for extending or retracting the spindle 34 axially. These adjustments permit the grinding element to be variously positioned and angularly related with respect to the carriage so that by using the proper grinding element, for example a disk grinder or a cup wheel, different types of rotary cutters may be sharpened.

The tailstock 27 is in the present instance of conventional form and requires no detailed description. The center 29 of the tailstock is preferably dead, and this is also true of the center 28 of the headstock 26.

The headstock 26 includes a correlated relationship of parts whereby the cutting elements to be sharpened on the work piece A may be properly indexed by a simple, efficient and accurate means adapted for manual actuation; the angular relationship between the cutting elements and the grinding element may be accurately and efficiently effected by a manually operative, rotative adjustment means; and the rotation of the work piece to compensate for the lead of the cutting elements thereon may be accurately determined and maintained during the manually effected reciprocation of the carriage. The indexing mechanism will first be considered and the exemplary structure thereof may best be seen with reference to Figs. 1 to 10 inclusive.

The headstock includes a base slide 39 (Figs. 2 and 3) of substantial size having side walls 40 dimensioned and finished to include complemental recesses for engaging the ways 25, a top wall 41 (Fig. 3) spaced above the carriage, and outer and inner end walls 42 and 43 respectively. Between the outer and inner ends of the base slide is an upstanding casing defined by end walls 44, 45 and a semi-cylindrically shaped top wall 46. The outer end wall (the wall designated 44 in Fig. 3) has an opening 47 of substantial size which is closed by a detachable cover plate 48, to which the outer end of the center 28 is rigidly secured. The inner end wall 45 also has an aperture 49 of substantial size therein closed by an end plate 49ª and the margins of the apertures 47, 49 are rabbeted, as at 50, to receive bearings 51 which, in turn, support an elongated index sleeve 52. This sleeve may be considered the basic or primary element of the headstock assembly, since the index and lead control mechanisms, and the rotative feed means, are supported largely by, or function through, the sleeve.

Figure 9:
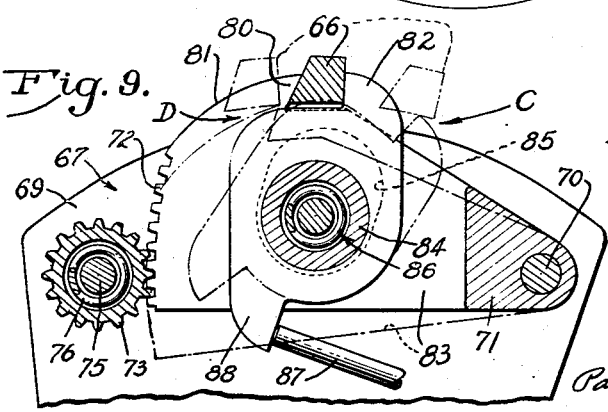
Fig. 9 is an enlarged view showing a detail of the construction and operation of the indexing mechanism taken along the line 9—9 of Fig. 3.
Figure 10:
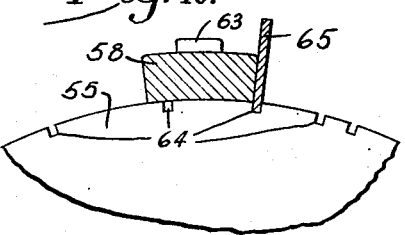
Fig. 10 is a fragmentary view illustrating a detail of the setting adjustment of the indexing mechanism.

Rotatably mounted on the inner end of the sleeve 52 and upon the adjacent portion of the center 28, which projects beyond the sleeve, is a collar 53 (Fig. 3) constituting a supporting base for the indexing mechanism. The collar has a radially outstanding flange 54 providing a seat for an annular index plate 55, the parts being secured together as by screws 56 extending through a flange 57 on the index plate into engagement with the radial flange 54. This assembly constitutes what may be termed a dividing head. The dividing head peripherally carries a plurality of adjustable index dogs 58 (Figs. 3, 8, 9 and 10) depending on the number of index positions. Each dog is a generally rectangularly-shaped member having an arcuate inner face complemental to the periphery of the index plate 55 and this face presents a tapered rib 59 adapted to seat in a complementally-shaped groove 60 comprising the stem portion of a peripheral T-shaped slot in the index plate. The enlarged head 61 of the slot slidably receives a clamp nut 62 provided for engagement by a bolt 63 which extends through the dog. Thus, the dog may be detachably secured in any position of adjustment circumferentially of the index plate. Referring to Fig. 10, the adjusted positions of the dogs may be determined by providing a series of axially parallel notches 64 in the periphery of the index plate each to receive a gauge plate 65 for accurately locating the position for one index dog. This arrangement is used principally where the dogs are evenly spaced apart. Irregularly spaced positions may be ascertained by properly locating the cutter element surfaces successively with respect to the grinding wheel and adjusting the index dogs correspondingly.

Figure 8:
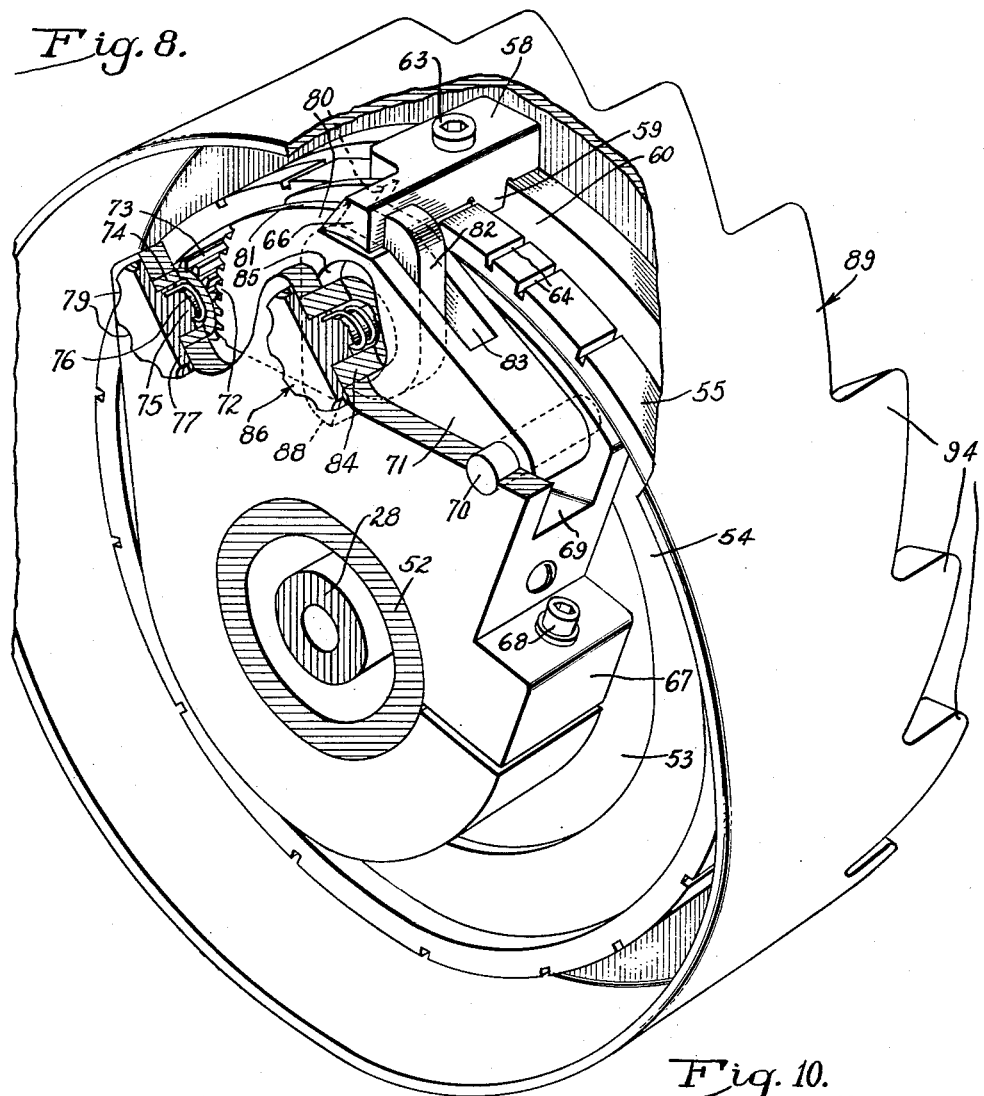
Fig. 8 is a view in perspective on an enlarged scale of the indexing mechanism of the headstock, certain parts being broken away to show details of the construction.

Each index dog, as may be seen in Figs. 3 and 8, carries a finger 66 which projects beyond the outer side face of the index plate. This finger cooperates with a locating device to determine the indexed position of the mechanism. The stop or locating device includes a supporting member 67 (Figs. 4 and 8) mounted on the sleeve 52 between the closure plate 49ª of the headstock casing and the index plate 55 and its associated collar. In this instance, the supporting member is a split collar adjustably secured to the sleeve by the screw 68. The supporting member in part extends approximately to the periphery of the index plate and is provided with a recess 69 of substantial depth. A triangularly shaped stop lever 71 is pivoted at its apex in this recess by a pin 70 (Figs. 8 and 9) and has an arcuate face remote from the pivot provided with a series of gear teeth 72. A pinion 73 on a hollow sleeve 74 is journaled on the supporting member 67 in engagement with the gear teeth. The pinion 73 is spring urged in a direction which will swing the stop lever 71 outwardly of the recess 69. To this end, a pin 75 disposed concentrically within the sleeve 74 has one end of a tortion coil spring 76 connected thereto, the other end of the spring being fixed to the sleeve. With reference to Figs. 8 and 9, the spring is wound to exert a tension which will rotate the pinion 73 in a counterclockwise direction. The tension of the spring may be suitably adjusted by means of a finger piece 77 on the pin 75, and maintained by a screw 78 (Fig. 4)

carried by the supporting member 67 for selective engagement with one of a series of notches 79 in the periphery of the finger piece 77.

The relationship of the stop lever 71 to the supporting member 67 is such that the stop lever extends from its pivot pin 70 in a direction which is opposite to the direction of adjustment of the indexing mechanism from one position to another. Thus, as shown in Fig. 8, the stop plate extends toward the left from the pivot pin, since the direction of movement of the indexing mechanism, as viewed in this figure, is clockwise. Intermediate the gear teeth 72 and the pivot 70, a notch is formed on that edge of the stop lever which projects from the recess 69 to define a tooth 80 disposed for engagement by the projecting finger 66 of the index dog 68. The tooth is preferably undercut and the adjacent face of the finger is of complemental shape. Between the tooth 80 and the gear teeth, the edge of the stop lever is shaped as a cam surface 81 to permit the finger 66 upon clockwise rotation to ride over and depress the stop lever against the tension of the spring 76.

To maintain engagement of the stop finger normally with the tooth 80, a spring urged holding dog 82 is provided in opposed relation to the tooth for cooperation therewith to provide coacting latch jaws. In the present instance, the stop lever is provided in the free end with a longitudinally extending bifurcation or slot 83 traversing the gear teeth 72 and tooth 80, and the holding dog is mounted in this slot with an end projecting therefrom. Supporting the holding dog is a sleeve 84 (Figs. 3, 8 and 9) which is journaled on the supporting member 67 to extend across the recess 69 and through an elongated clearance slot 85 in the stop lever 71. This relationship supports the holding dog for pivotal movement and also limits the swinging movement of the stop lever. The holding dog is resiliently and yieldably urged in the direction of the tooth 80 and into engagement with an index dog finger 66 associated therewith by an adjustable spring assembly 86, similar to that by which the pinion 73 is spring loaded. An elongated pin 87 (Fig. 4) adjustably mounted on the supporting member 67 has its end located for engagement with a finger 88 on the holding dog to limit the movement of the holding dog in the direction of the tooth 80.

This arrangement and relationship of parts provides for efficient and accurate indexing by manual operation. Thus, looking at Figs. 8 and 9, and presuming that the index dogs have been properly adjusted each to an individual index position, rotation of the index plate in a clockwise direction will move an index dog finger 66, which is then held against the tooth 80 by the holding dog 82, out of such engagement. During this movement, the holding dog is swung against the force of its urging spring, as indicated at C (Fig. 9), until the finger has cleared the dog permitting the dog to be swung toward the tooth 80 to the extent determined by the limiting pin 87. Continued rotational movement of the index plate causes the next index dog finger to ride over the cam surfaces 81 on the stop lever 71, as indicated at D (Fig. 9), thereby depressing the lever. The holding dog 82, however, remains in its extended position so that the operator can readily determine when the mechanism has nearly reached the next index position. A relatively short continued rotation carries the index finger past the lip of the tooth 80 permitting the stop lever to swing upwardly whereupon a reverse rotation seats the index finger in the notch and the angular relationship of the meeting faces of the tooth and the index finger insures movement of the parts into proper relation. The spring, which exerts its force rotatively on the holding dog 82, is of ample strength normally to effect the reverse rotation and thereafter maintain the index finger against accidental displacement from its engagement with the stop lever.

For the convenience of the operator in manipulatively rotating the index plate, an annulus 89, which is removable to permit the index mechanism to be set or adjusted, encircles and overlies the index plate and the stop device. The annulus has an internal radial flange 90 (Figs. 3 and 5) positioned for abutment against the side face of the index plate 55, and such means as screws 91, carried by the index plate for engagement with bayonet slots 92 on the flange 90, secure the annulus to the index mechanism. Pivotal wedge clamps 93 (Fig. 5) maintain the parts against relative rotation. The annulus includes such means as a series of lateral projections 94 for facilitating movement of the index mechanism by the operator.

The index mechanism supporting collar 53 has a hub portion 95 which supports and carries with it a rotative chuck mechanism generally designated 96 (Figs. 2, 3, 11 and 12). This mechanism includes an offset, axially extending arm 97 having a fixed finger 98 adapted to cooperate with a pivoted, spring-pressed finger 99 to provide a yoke for receiving the end of an arm or dog 100 which is detachably mounted on the arbor or shank B of the work piece. It is through this connection that the movement of the indexing mechanism is transmitted to the work piece.

The rotary chuck mechanism is arranged to enable the operator to obtain manually an accurate control of the relationship between the element to be sharpened and the grinding element. In the case of a hob, this control may be used to determine precisely the amount of material to be removed from the faces of the cutter teeth. In reamers and milling cutters, the mechanism allows the operator to make a proper adjustment for a diameter cut and then quickly to set the machine for cutting the desired relief clearance. Moreover, the mechanism permits the operator quickly and accurately to duplicate the original cutting adjustments for successive work blanks. A preferred form of rotative setting mechanism is best illustrated in Figs. 11, 12 and 13. The hub portion 95 of the index mechanism supporting collar 53 has an integral endwise extending sleeve 101 which encircles and terminates short of the free end of the center 28. A ring gear 102, having peripheral gear teeth, encircles the sleeve 101 adjacent to the end face of the hub 95. A second sleeve 103 is relatively rotatable on the sleeve 101, between the ring gear and a retaining ring 104 screw threaded on the end of the sleeve 101. An annular member 105, with which the arm 97 is integral, encircles the sleeve 103 and has an end rabbet 105ª seating on the retaining ring 104. The annular member is adapted to be adjustably fixed to the sleeve 103 for movement therewith by such means as a pair of clamping wedge elements 106 (Fig. 13) which are mounted in a bore 107 arranged in the annular member to intersect its inner surface peripherally, the clamping elements being engageable with or disengageable from the sleeve 103 by a manipulable screw 108.

Rotatably seated between the hub 95 of the index mechanism and the annular member 105, and encircling the inner ends of the sleeves 101 and 103, is an externally knurled ring 109 constituting an adjusting nut. The ring has an inwardly facing channel 109ª (Fig. 11) defined by flanges 110, 111.

The end of the sleeve 103 adjacent to the gear 102 has a peripheral gear 112 formed thereon. The gears 102 and 112 face toward the channel 109ª and form a part of a planetary gear system which is completed by a pair of pinions 113 and 114 pinned together as at 115 and rotatable about a common shaft 116 supported by the flanges 110 and 111. A differential in the numbers of teeth in the gears and pinions 102, 113, 114 and 112 provides a greatly reduced driving ratio between the ring 109 and the annular member 105. This ratio is preferably on the order of a 50–60 to 1 reduction. Such means as a clamp nut 117 mounted on the retaining ring for engagement with the sleeve 103 may be provided to secure the parts in positions of adjustment.

The rotary feed mechanism is thus supported for movement with the index mechanism yet permits the operator separately to adjust the rotary feed of the work to the grinding element. Because of the high ratio reduction in the drive exceeding accuracy is possible. As shown in Fig. 14, the adjustment of the rotative feed permits the mechanism to be set for cutting relief clearance on a reamer blade. To adjust the mechanism for a diameter cut on the same blade, it is only necessary for the operator to rotate the ring 105 to shift the blade from one position to the other, as for example from the full to the dotted outline positions as shown in Fig. 14, the grinding element being axially adjusted accordingly. To insure exact duplication of these cuts on successive blanks, the ring carries a lug 118 in overlying relation to the external surface of the collar 53 of the index mechanism. The lug cooperates with one or more pins 19 which are insertable selectively in a circumferential series of closely spaced bores 120 in the index collar 53. After the proper adjustment has been determined by abutment of the lug 118 against a pin 119, the parts may be secured by the clamp 117. The rotary clutch mechanism thus facilitates the selection of different angular adjustments of the work piece.

The lead control mechanism is embodied in a novel, compact and efficiently operating mechanism, and serves to maintain the same relationship at the point of contact between the cutting element and the part being sharpened during movement of the work piece past the cutting element. The lead control mechanism functions through the basic sleeve 52 to transmit to the work piece, through the indexing mechanism, a required rotational movement as determined by the spiral angle of the cutters on the work piece, and the mechanism includes such means as an adjustable sine bar for fixing the degree of movement of the mechanism and a novel relationship of spring means and a sine bar follower device for correlating the rotational movement of the collar with the longitudinal travel of the work piece. The spring means for imposing a rotational resilient force on the collar in one direction, preferably in the direction in which the work piece will usually be rotated, may best be seen with reference to Figs. 3, 6 and 7.

Figure 6:
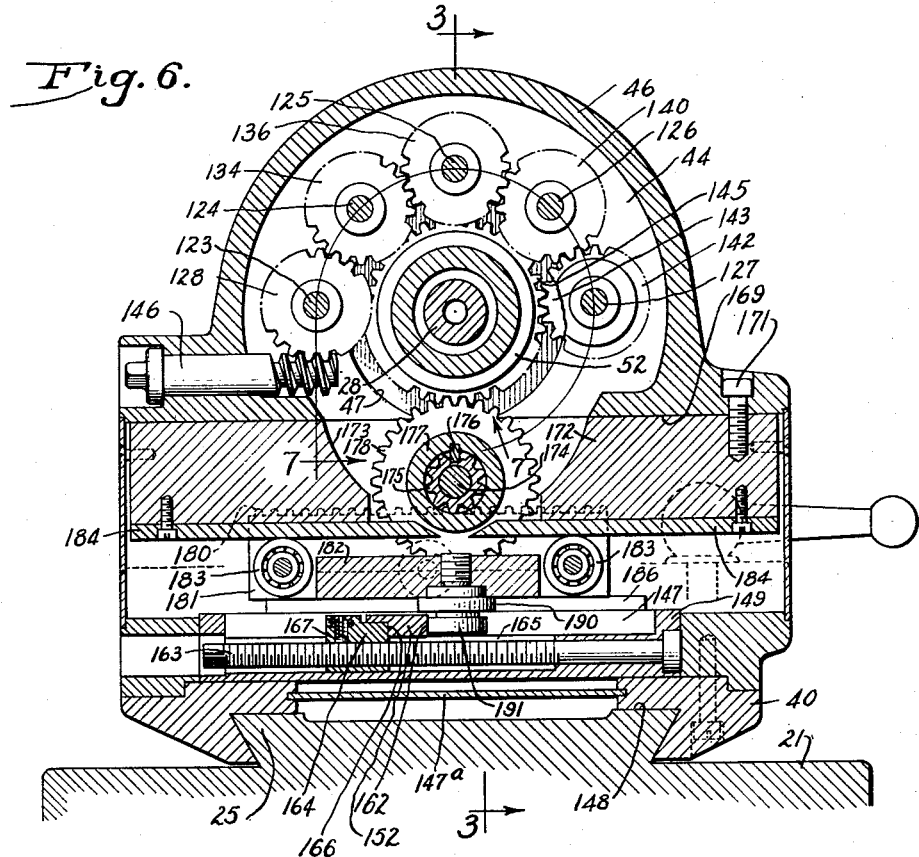
Fig. 6 is a transverse sectional view through the headstock taken along the irregular line indicated by the arrow 6—6 in Fig. 3.
Figure 7:
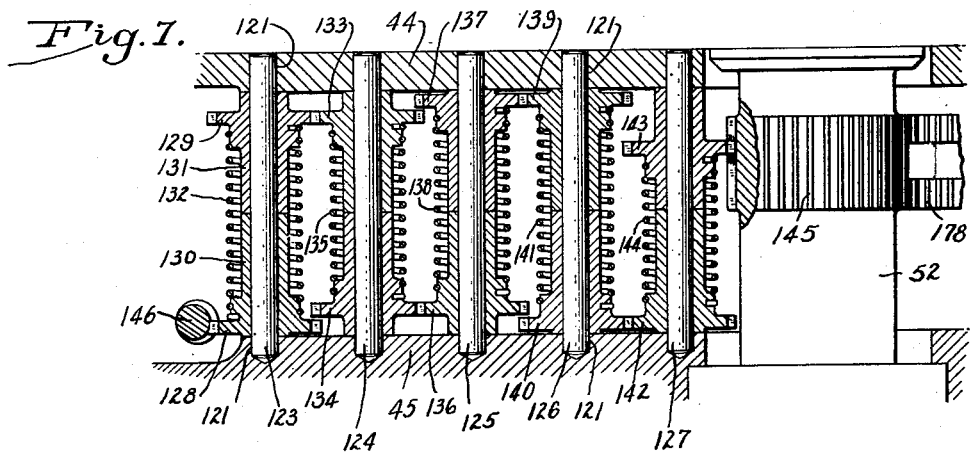
Fig. 7 is a view illustrating the tension applying means in the rotary feed mechanism, the circular arrangement of the parts indicated by the line 7—7 in Fig. 6 being for clarity transposed to and shown in a plan development.

The end walls 44 and 45 of the headstock casing are provided with a series of alined bores 121, the axes of which parallel the axis of the sleeve 52. As shown in Fig. 6, the series of bores extends annularly approximately half-way about the sleeve, and each pair of bores receives a bearing pin, respectively and successively designated 123, 124, 125, 126 and 127. The end pin 123 rotatably carries a pair of gear elements 128 and 129 disposed near the side walls 45 and 44, respectively, which have elongated hubs 130 and 131 extending toward each other into running contact midway of the pin. Encircling the hubs is a torsion coil spring 132 which is connected at its ends to the hubs of the gear elements 128 and 129. The second pin 124 in the series carries a generally similar arrangement of gears 133, 134 and spring 135, the gear 133 being in mesh with the gear 129 and the gear 134 being out of mesh with the gear 128. Similarly, the third and fourth pins 125 and 126 carry gear and spring assemblies 136, 137 and 138; 139, 140 and 141, respectively, the gear 136 being in mesh with the gear 134 and the gear 139 with the gear 137. The fifth pin 127 in the series has a somewhat similar pair of gear elements 142 and 143 connected by an interposed spring 144, and in this assembly the gear 142 meshes with the gear 140 on the pin 126. The gear 143 is located toward the center of the pin 127 for engagement with a pinion 145 on the sleeve 52. The first gear in the system (the gear 128) engages a tensioning anchor screw 146 (Fig. 6) mounted on the casing, and the relationship shown is such that the tensioning screw adjustably rotates the gear 128 and each successive pair of gears to create a desired resilient force for urging the sleeve 52 in a counterclockwise direction as viewed in Fig. 6. This arrangement provides a system which is exceedingly compact yet permits the imposition of a rotational spring force on the sleeve 52 which is the equivalent of the force that would be produced by a long heavy spring.

Figure 2:
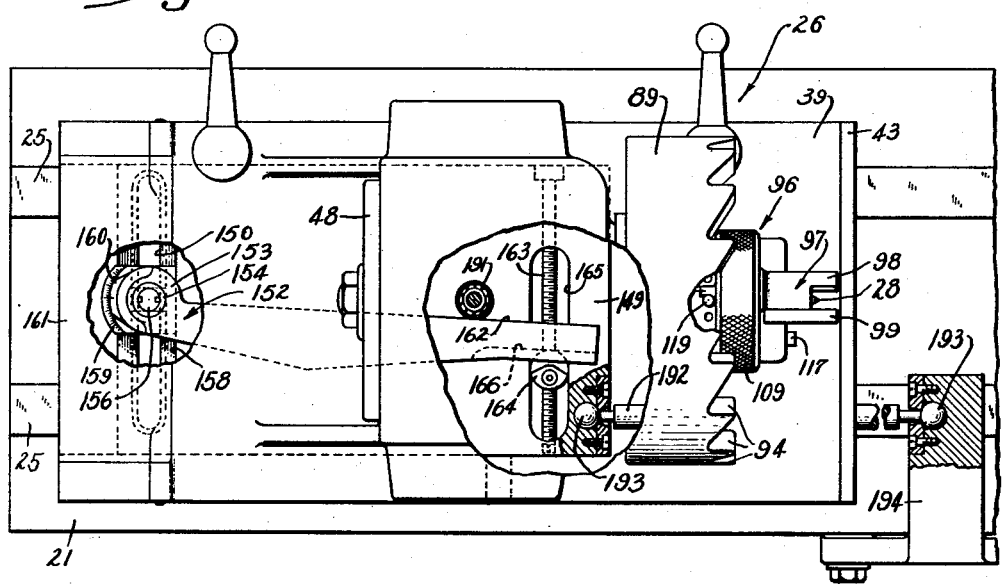
Fig. 2 is a fragmentary plan view partially in section of the headstock of the machine.

The sine bar and its associated structure is best illustrated in Figs. 2, 3 and 6. In the base 39 of the headstock, the top wall 41 is spaced above the top surface of the carriage 21 to provide a chamber 147, the lower face of which is closed by a guard wall 147ª. The side walls of the base are, as shown at 148 (Fig. 6), finished to provide a longitudinal guideway for a plate 149 constituting a support for the sine bar assembly. At its outer end (the left-hand end as seen in Figs. 2 and 3), the plate 149 has an elongated transversely extending T-slot 150. An elongated sine bar 152 has an enlarged head 153 which is bored to receive a bearing 154 and a bolt 156 extends through the bearing to engage a nut 157 slidably seated in the T-slot 150. The upper surface of the plate 149 adjacent the slot is cut away, as at 158, to receive a gauge plate 159 having hub sections which encircle the shank of the screw and extend into the T-slot 150 and into the bearing 154. The gauge plate 159 carries indicia for cooperation with other indicia on a finger 160 on the sine bar head. This arrangement permits transverse adjustment of the pivoted end of the sine bar relative to the supporting plate 149 and the relationship between the gauge plate and the sine bar remains unchanged in any position of adjustment. The overlying end portion of the headstock base is arranged as a hinged cover 161 providing access for adjustment of the sine bar assembly.

The sine bar extends inwardly across the top surface of the plate 149, as shown in Fig. 2, and at its inner free end is engaged by means for determining the angular relation of its operative surface 162 to the line of reciprocation of the carriage. In this instance, this means comprises a screw 163 (Figs. 2 and 6) mounted on the plate 149 for rotational movement only. The screw extends transversely of the length of the sine bar and engages a traveling nut 164 which is slidably mounted in a transverse slot 165 in the plate 149. The nut projects above the upper surface of the plate and is cut away to fit cooperatively in a recess 166 in the adjacent edge of the sine bar. Such means as a spring friction drag or detent 167 maintains any position of adjustment.

The sine bar is held against the adjusting nut by the engagement therewith of a follower on which is imposed the spring force that rotatably acts on the sleeve 52. As shown in Fig. 3, the headstock casing intermediate the walls 44 and 45 has a section 168 which defines an enlarged transverse bore 169. The lower portion of the bore communicates with the chamber 147 through a slot 170. Fixed in the upper portion of the bore 169, as by screws 171, is an elongated assembly plate 172 which carries the follower device assembly. The assembly plate has a central milled slot 173 which extends vertically through the plate. Traversing the slot and supported by the plate is a pin 174 having an elongated pinion 175 rotatably mounted thereon. Keyed, as at 176, to the intermediate portion of the pinion is the hub 177 of a double gear 178. The latter gear is arranged to mesh with the pinion 145 on the sleeve 52, is substantially narrower than its carrying pinion 175, and has a peripheral annular recess 179. The projecting ends of the pinion 175 mesh with rack teeth 180 formed on the upwardly extending flanges of a U-shaped rack slide 181 which straddles the double gear. The rack slide is guided in its movements by the interfitting relationship of the slide, the walls of the bore 169, and the assembly plate 172, and has a longitudinally extending rib 182 upstanding from its base to project into the recess 179 of the gear 178. At the ends of the rib, antifriction rollers 183 are arranged for engagement with a wear plate 184 secured to the lower face of the assembly plate 172. On each side of the rack plate, intermediate the ends thereof, are similar antifriction rollers 185 which run on a wear plate 186 disposed as a partition between the chamber 147 in the base of the headstock and the bore 169 and communicating slot 170.

The rack slide and its upstanding rib 182 are arranged to receive the screw threaded end 187 of a vertically disposed pin 188 which extends downwardly through an elongated slot 189 in the wear plate 186. An antifriction collar 190 is supported on the pin in opposition to the margins of the slot, and the lower end of the pin carries an antifriction roller 191 in proper position for engagement with the working face of the sine bar.

As has been stated, the pinion 145 on the sleeve 52 is, in operation, urged in a counter-clockwise direction by the spring means associated therewith. The force of the spring means is, therefore, transmitted in a clockwise direction to the double gear 178 and thence to the pinion 175. The engagement between the pinion and the rack 180 urges the rack slide to the left, as seen in Fig. 6, and holds the follower against the working face of the sine bar 152. Relative movement between the sine bar and the follower on the headstock is, in the present instance, obtained by such means as a pull bar 192 (Figs. 1 and 2) which, through ball and socket joints 193, is connected at one end with the sine bar plate 149 and at the other end with a bracket 194 mounted for longitudinal adjustment on the bed.

In considering the operation of the machine, it is to be noted that every manipulative act, excepting of course the operation of the grinding wheel, is manually effected, yet every operation is mechanically controlled. Thus, the transition from one index position to another results when the operator grasps the ring-shaped member 89, rotates the index mechanism until a click indicates that the next position is reached. A slight reverse rotative movement produced by the spring urged holding dog 82 automatically locks the mechanism in an accurately predetermined position from which it cannot be disengaged until the operator again manipulates the index mechanism.

The same considerations are true of the feed control mechanism in determining the proper relationship between the part to be sharpened and the grinding element. In sharpening a hob, the operator determines the quantity of material to be removed from the face of the hob teeth and by means of the feed control obtains the proper relationship between the hob and the grinding wheel. If a reamer is to be sharpened, the operator may initially determine the proper settings for making the diameter and relief clearance cuts. These settings being indicated on the feed control can readily be duplicated in sharpening a similar reamer.

The lead control mechanism is relatively simple to adjust and functions positively and accurately as the carriage is manually reciprocated. The compact arrangement, by which a rotative spring force is imposed on the sleeve 52 in the headstock, causes the follower to maintain close engagement with the sine bar and the slope of the sine bar is accurately reproduced as rotary movement of the work piece. The sine bar may be easily and conveniently adjusted and may be set parallel with the line of carriage reciprocation if the cutting elements are straight or to extend angularly to said line in either direction in accordance with the angularity of right or left-hand leads of inclined or helical elements. Should it be desired to lock the sleeve 52 against rotation, as in the case of sharpening a straight gash hob, such means as a lock pin 195 (Fig. 3) mounted on the end plate 48 for engagement with a bore 196 in the sleeve 52 may be provided.

I claim as my invention:

1. In a machine for sharpening rotary cutters, the combination of a bed, a rotary sharpening element on said bed, a carriage reciprocable past said element and having a head stock and a tailstock thereon, rotatable lead control means mounted in said headstock including a rotatable member and an adjustable sine bar for rotating said member as said carriage reciprocates, indexing means movable with said member and having a part rotatable independently of said member into different positions of index, and chuck means movable with said part and including means for driving connection with a work piece, and means for effecting rotational adjustment of said work piece independently of said indexing means.

2. In a machine for sharpening rotary cutters, the combination with cutter sharpening means, and a work supporting carriage reciprocable past said sharpening means, of a headstock on said carriage, lead control means on said headstock movable rotatably in the reciprocation of said carriage in accordance with the lead of the cutter element being sharpened, position control means rotatable with said lead control means for indexing successive cutter elements into operative relation to said sharpening means, and feed adjusting means rotatable with said position control means and adapted for driving connection with a rotary cutter.

3. In a machine for sharpening rotary cutters, the combination with cutter sharpening means, and a work supporting carriage reciprocable past said sharpening means, of a headstock on said carriage, lead control means on said headstock including a rotatable member and a manually adjustable sine bar for moving said member rotatably in the reciprocation of said carriage in accordance with the lead of the cutter blade being sharpened, position control means movable with said rotatable member for indexing successive cutters into operative relation to said sharpening means, and feed adjusting means rotatable with said position control means and adapted for driving connection with a rotary cutter.

4. In a machine for sharpening rotary cutters, the combination with cutter sharpening means, and a work supporting carriage reciprocable past said sharpening means, of a headstock on said carriage, lead control means on said headstock movable rotatably in the reciprocation of said carriage in accordance with the lead of the cutter blade being sharpened, position control means mounted for rotary movement with said lead control means and manually operable independently of said lead control means to index successive cutters into operative relation to said sharpening means, and feed adjusting means rotatable with said position control means and adapted for driving connection with a rotary cutter.

5. In a rotary cutter sharpening machine having cutter sharpening means, and a work supporting carriage reciprocable past said sharpening means, the combination in a headstock on said carriage, of lead control means on said headstock movable rotatably in the reciprocation of said carriage in accordance with the lead of the cutter blade being sharpened, position control means rotatable with said lead control means for indexing successive cutters into operative relation to said sharpening means, and feed adjusting means rotatable with said position control means and including a member for driving connection with a rotary cutter, a manually operable adjusting nut, and a speed reduction connection between said nut and said member.

6. A headstock for a machine of the character described having, in combination with a reciprocable headstock supporting carriage, a rotatable sleeve, means connected with said sleeve for driving it rotatably in accordance with the lead of the work piece as the carriage reciprocates, and feed adjusting means rotatable with said sleeve and operable independently thereof to adjust the position of the work piece.

7. A headstock for a machine of the character described having, in combination, a rotatable sleeve, means connected with said sleeve for driving it rotatably in accordance with the lead of the work piece, indexing means rotatable with the sleeve and adjustable independently thereof to index the work piece, and feed adjusting means rotatable with said sleeve and operable independently thereof to adjust the position of the work piece.

8. In a machine for sharpening rotary cutters, a headstock mounted for movement with a reciprocable carriage on the machine and having, in combination, a rotatable sleeve, means for yieldably urging said sleeve in one direction including a series of spring members connected to exert their forces cumulatively on said sleeve, an adjustable sine bar, a sine bar follower connected with said sleeve and held against said sine bar by the force of the sleeve urging means, and means for transmitting to a work piece the rotary movement of said sleeve resulting from the travel of said follower along said sine bar.

9. In the reciprocable headstock of a machine for sharpening rotary cutters, the combination of a center, a rotatable sleeve encircling said center, means for yieldably urging said sleeve in one direction including a plurality of torsion springs compactly arranged in annular series relative to said sleeve, means for connecting said springs to exert the combined force thereof on said sleeve, an adjustable sine bar, a sine bar follower connected with said sleeve and held against said sine bar by the force of said springs, and means for transmitting to a work piece the rotary movement of said sleeve resulting from the travel of said follower along said sine bar as the headstock reciprocates.

10. In a rotary cutter sharpening machine having a bed and a reciprocating carriage, the combination in a headstock mounted for movement with said carriage of a rotatable sleeve, of spring members arranged in annular series above said sleeve and connected in series with each other and with said sleeve to exert a cumulative force on said sleeve for urging the sleeve in one rotary direction, a sine bar disposed between the bed and carriage and adjustable relative thereto, a sine bar follower drivingly connected with said sleeve and held against said sine bar by the force of said springs, and a driving connection between said sleeve and a work piece.

11. A headstock for a machine for sharpening rotary cutters having, in combination with a reciprocable headstock supporting carriage, a rotatable sleeve, means for yieldably urging said sleeve in one direction including a plurality of torsion springs, gear means connecting said springs and sleeve in series to provide a cumulative torsional force acting on said sleeve in one direction, an adjustable sine bar, a sine bar follower assembly including a rack slide movable transversely of the axis of said sleeve, a rack on said slide and a sine bar follower, a pinion connected with said sleeve and engaging said rack to hold said follower yieldingly against said sine bar, and means for transmitting to a work piece the rotary movement of said sleeve resulting from the travel of said follower along said sine bar.

12. In a rotary cutter sharpening machine having a carriage reciprocable in operative relation to a sharpening device comprising, in combination, a headstock having a center, and a manually operable indexing mechanism on the headstock including a rotatably shiftable support, a dividing head rotatable with respect to said support and having a plurality of index dogs adjustably mounted thereon, clamping means on said support for selective engagement with one of said dogs, and means for drivingly connecting said dividing head with a cutter supported by said center.

13. A headstock for a rotary cutter sharpening machine having a carriage reciprocable in operative relation to a sharpening device comprising, in combination, a casing on said carriage, a center on said casing, and a manually operable indexing mechanism on the casing including a support, a dividing head rotatable relative to said support and having a plurality of index dogs adjustably mounted thereon, clamping means on said support for selective engagement with one of the dogs, said clamping means including a tooth engageable by a dog and arranged to hold the dog against movement in one direction of rotation, and spring urged means engageable with said dog for holding it against accidental movement from said tooth, and means for drivingly connecting said dividing head with a cutter supported by said center.

14. A headstock for a rotary cutter sharpening machine having a carriage reciprocable in operative relation to a sharpening device comprising, in combination, supporting means having a center thereon, a dividing head rotatably mounted on said supporting means and adapted for driving connection with a cutter supported by said center, a plurality of index dogs adjustably mounted on said head, clamping means on said supporting means for selective engagement with one of said dogs including a jaw movable into and out of the path of rotation of said dogs and having a dog engaging tooth for preventing rotational movement of the dog and head in one direction, a cooperating jaw retractable to permit movement of said dog and head in the opposite direction, and means for urging said cooperating jaw against a dog to hold said dog and head against such opposite movement.

15. In a machine of the character described having a carriage reciprocable in operative relation to a sharpening device, the combination of a headstock on said carriage, a headstock center, a manually rotatable dividing head on said headstock having a plurality of index dogs adjustably mounted thereon, a clamping jaw pivoted on said headstock for generally radial swinging movement relative to the path of rotary movement described by said dogs, means for urging said clamping jaw into said path, means for retracting said jaw to permit passage of a dog in one direction of rotary movement of said head, a dog engaging tooth on said jaw for preventing opposite rotary movement of said head, a cooperating clamping jaw pivoted for movement toward and away from said first mentioned clamping jaw, means for urging said cooperating clamping jaw into engagement with a dog to hold it against said tooth, said cooperating jaw being retractable by the force exerted by the operator to rotate the dividing head, and means for drivingly connecting said dividing head with a cutter supported by said center.

16. In a machine of the character described, a headstock having, in combination, a center, a rotatable work indexing mechanism, and a chuck supported by and movable with said mechanism including a rotatable member for driving engagement with a work piece supported by said center, and means manipulable by the operator for rotating said member.

17. In a machine of the character described, a headstock having, in combination, a center, a chuck support, and a chuck mounted on said support including a rotatable member for driving engagement with a work piece supported by said center, an adjusting nut rotatably supported with respect to said support and rotatable member, and a speed reducing planetary gear system drivingly connecting said rotatable member with said nut.

GERARD A. DE VLIEG.